A. S. HUBBARD.
ELECTRICAL SYSTEM OF DISTRIBUTION.
APPLICATION FILED MAY 4, 1908.
1,009,311.
Patented Nov. 21, 1911.
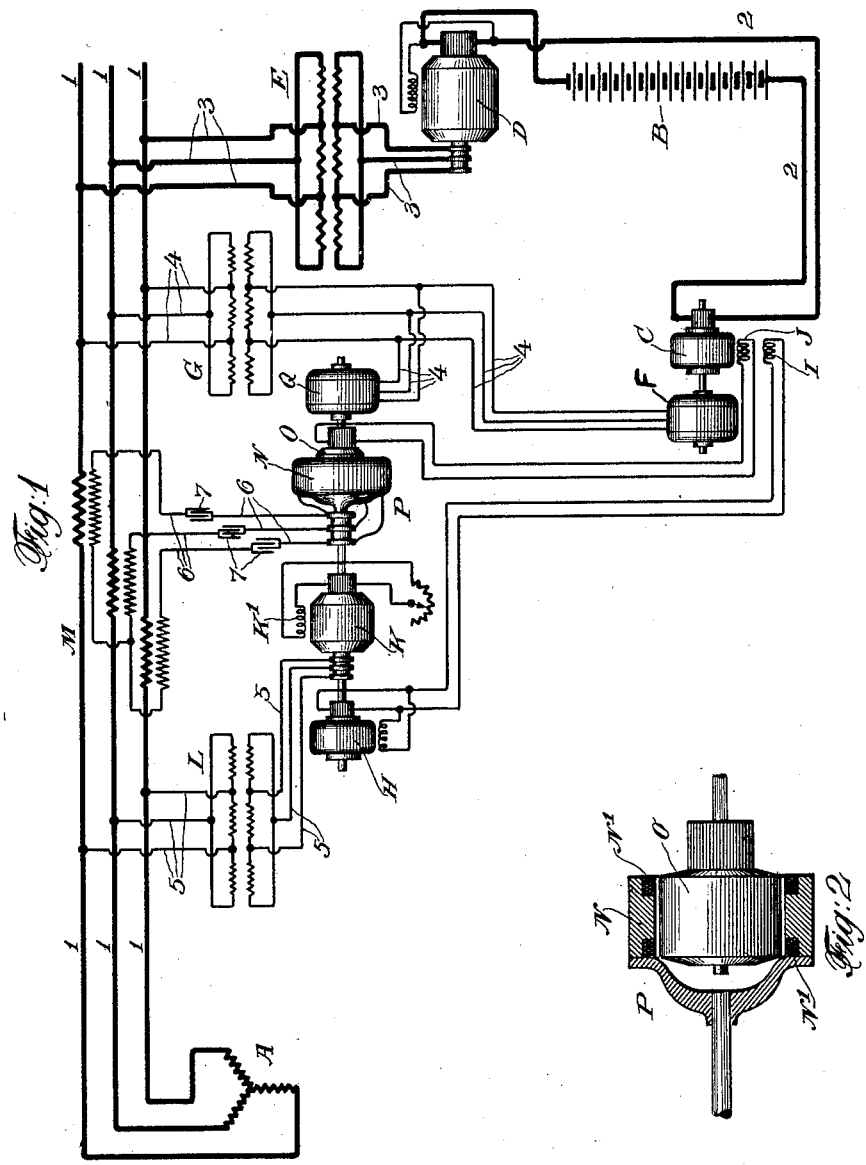

UNITED STATES PATENT OFFICE.

ALBERT S. HUBBARD, OF BELLEVILLE, NEW JERSEY, ASSIGNOR TO GOULD STORAGE BATTERY COMPANY, A CORPORATION OF NEW YORK.

ELECTRICAL SYSTEM OF DISTRIBUTION.

1,009,311. Specification of Letters Patent. Patented Nov. 21, 1911.

Application filed May 4, 1908. Serial No. 430,633.

*To all whom it may concern:*

Be it known that I, ALBERT S. HUBBARD, a citizen of the United States, and a resident of Belleville, county of Essex, and State of New Jersey, have invented certain new and useful Improvements in Electrical Systems of Distribution, of which the following is a specification.

My invention relates to electrical systems of distribution and more particularly to the regulation of alternating current systems of distribution. I have specially devised my invention for use with alternating current systems of distribution with which a storage apparatus, such as a storage battery, is operatively arranged as compensatory influence. My invention in its more specific phase includes combinations specific to such a system. In its broader phase, however, it is not limited to this particular type of system.

My invention includes a simple and efficient regulating apparatus whereby a regulating current may be produced with the least possible lag with relation to the main alternating current fluctuations and this regulating current may be responsive to the energy current of the system or to the wattless current of the system, or to any desired component or components of the main alternating current energy.

In my application filed February 25th, 1908, Serial No. 417,758 I have disclosed and claimed a dynamo having an independently rotated armature and field, the field being rotated in synchronism with an alternating current by which it is energized, the circuits of said alternating current being such as to produce a field rotating in the opposite direction to the rotation of the field magnet structure. In my present invention I employ a dynamo having these characteristics, but while rotating the field structure in synchronism with the voltage of the alternating current system I supply such field structure with a rotating magnetic field that is responsive in strength and is in synchronism with the current of the alternating current circuit. By this means, as will be more particularly explained hereinafter, I am able to obtain a regulation that is responsive to power factor changes in the circuit and I do this with the minimum of apparatus in the regulating circuit and with a negligible lag between the fluctuations in the main circuit and the resulting fluctuations in the regulating circuit.

In the present instance I will describe an embodiment of my invention in which I provide a regulating current whose intensity varies with the energy current of the system and this regulating current is used to regulate the field strength of a booster which is in the battery circuit. This regulating current may, however, be used for any desired purpose in accordance with my invention in its broader phase, and according to the position of the brushes on the commutator of the regulating dynamo the intensity of the current may correspond to the wattless current of the system or to some other standard.

Further and more specific features of my invention will appear from the detailed description given below, taken in connection with the accompanying drawings which form a part of this specification.

In the drawings, Figure 1 shows diagrammatically a system embracing one embodiment of my invention, and Fig. 2 is a detail illustration partly in section of my peculiar regulating dynamo.

Referring to Fig. 1, A represents any source of three phase currents supplying the main polyphase alternating current distribution circuit, 1, 1, 1. B represents a storage battery located in the direct current battery circuit 2, 2. Also in the direct current circuit 2, 2, and in series with the battery B is the armature of a booster C, and the direct current end of a rotary converter D. The alternating current end of the rotary converter D is connected to the main circuit, 1, 1, 1, by a transformer E and connections 3, 3, 3. The booster C is driven by an induction motor F connected to the main circuit 1, 1, 1, by connections 4, 4, and transformer G. The booster C is also provided with two opposing field coils I and J, the coil I being connected across the armature of a direct current shunt dynamo H. The dynamo H is driven at practically a constant speed by the synchronous motor K and the flux produced by the field coil I remains practically constant. The synchronous motor is connected to the main circuit 1, 1, 1, through the connections 5, 5, 5, and transformer L, and is arranged with a commutator and brushes at one end of its armature and has connected thereto its field coils K'. In series in the main circuit 1, 1, 1, is a transformer M the secondaries of which are connected to distributed windings N' on a rotating field structure N through the connections 6, 6, 6, and condensers 7, 7, and slip rings. The rotating field structure N is driven by the synchronous motor K and has within it a rotating armature, O, (see Fig. 2) and these two elements constitute the essential parts of my peculiar regulating dynamo, P. The armature O is independently driven by an induction motor, Q, receiving its energy through the connections 4, 4, 4. The armature O of the dynamo P is connected in series with the field coil J and hence the strength of the field produced by said coil will be dependent upon the voltage generated in the armature O.

Since the transformer M is in series in the main circuit 1, 1, 1, and variations of load upon this circuit will operate to vary the field strength of the rotating field structure, N. The polyphase currents circulating in the field structure N produce a field flux which rotates relatively thereto, but, the synchronous motor K drives the field structure N in the opposite direction from the rotation of the flux and thus maintains the field flux in a substantially fixed position. The variations of field strength produced in the structure, N, by the fluctuations on the main circuit 1, 1, 1, cause the voltage generated in the armature O to fluctuate responsively thereto and consequently the strength of the field produced by the coil J varies responsively to the fluctuations on the main circuit 1, 1, 1. In order to keep the exciting polyphase currents in the windings N' from lagging, due to inductance in the rotating field structure N the condensers 7, 7, are inserted in the connections 6, 6, 6.

As long as the phase relation between the current and voltage of the system remains fixed the position of the alternating current field remains fixed. If, however, the power factor of system changes the position of this alternating current field will change and move slightly in one direction or the other. The brushes taking the direct current from the armature, O, however, remain stationary and, therefore, the difference of potential between them is dependent on the position of this field flux. But since the current furnished by the armature O, is proportional to this difference of potential between these brushes, this direct current will be varying with or responsive to the power factor changes of the system for any given total current on the system. This regulation for power factor changes may take place simultaneously with the regulation for load changes and also independently thereof.

With average energy delivered by generator A the booster C produces no voltage and the battery voltage is equal to that of the direct current end of the converter D, so that the battery neither receives nor gives out energy.

If an increase of load or energy current is imposed on the circuit, 1, 1, 1, the strength of the field produced by the coil J increases responsively thereto and a resultant field is produced in the booster C in such a direction that the booster will increase the voltage of the battery circuit and cause the rotary converter D to transfer energy from the battery to the main circuit 1, 1, 1, to take the extra load imposed thereupon. If the load on the main circuit 1, 1, 1, drops below normal the reverse operations take place and the converter D transfers energy from the circuit 1, 1, 1, to the battery to charge it.

Although I have shown the armature O as furnishing a current proportional to the energy current of the system, my broad invention is not limited to such an arrangement, since in some systems it might be advisable to move the brushes on the armature O so that the current taken by them would be proportional to the wattless current of the system.

Any variations of load in the main distribution circuit are quickly felt and compensated for by the battery since the induction in the regulating apparatus is materially decreased by my improvements.

I do not desire to be limited to the specific details shown and described since many changes therein may be made without departing from the spirit and scope of my invention, but

What I claim and desire to secure by Letters Patent is:

1. In an alternating current electrical system of distribution, a polyphase transmission circuit, a series transformer in each leg of said circuit, a dynamo field magnet having windings supplied by the secondaries of said transformers and arranged to produce a rotary magnetic field, a synchronous motor driving said field magnet and connected to be in synchronism with the electromotive force of said transmission circuit, an armature for said dynamo field magnet, having a commutator, and means for rotating said armature so that it may rotate relative to the field magnet.

2. In an alternating current system of electrical distribution, a polyphase transmission circuit, a series transformer in each leg of said circuit, a regulating dynamo provided with a field magnet the flux of which is rotatable electrically in synchronism with the current in said circuit and an armature with a commutator rotatable independently of said field, connections between said field, and said transformers, and means for mechanically rotating said field magnet in the opposite direction from said electrical rotation and in synchronism with the electromotive force of said circuit.

3. In an alternating current system of electrical distribution, an alternating current distribution circuit, transforming apparatus in said circuit, a regulating dynamo provided with distributed field windings connected to said transforming apparatus and arranged to produce a rotary magnetic field, means for mechanically rotating the structure of said field in synchronism with the electromotive force of said circuit, and said dynamo also provided with a rotatable armature arranged to produce a direct current.

4. In an alternating current system of distribution, an alternating current distribution thereto and provided with an alternating current field magnet the flux of which is rotatable electrically in synchronism with the current of said circuit and the current of which varies in intensity with the current of said circuit, means for mechanically rotating said field magnet in synchronism with the electromotive force of said circuit and an armature for said regulating dynamo provided with a commutator and independently rotatable.

5. In an alternating current system of distribution, an alternating current distribution circuit, a regulating dynamo in operative relation thereto, said dynamo having a field structure carrying an alternating current field flux rotating in synchronism with the current of the system, means for mechanically rotating said field structure synchronously with the electromotive force of the system, said dynamo also having an armature and commutator, said armature and field structure being independently mounted to be relatively rotatable.

6. In an electrical system of distribution, the combination of an alternating current distribution circuit, a regulating dynamo provided with independently rotatable armature and field structures, the latter carrying an alternating current field flux rotatable electrically in synchronism with and which is produced by a current varying in intensity with the current of the system, and means for mechanically rotating said field structure in synchronism with the electromotive force of the system.

7. The combination of an alternating current circuit, a field structure supplied therefrom, a member having windings and a commutator therefor, brushes thereon, means for producing a relative rotation between the field structure and the brushes, and independent means producing a relative rotation between the brushes and commutator.

8. In an electrical system of distribution, an alternating current distribution circuit, a storage battery in operative relation thereto, a regulating dynamo provided with an armature and an alternating current field structure the flux of which is rotatable electrically in synchronism with, and is produced by a current varying in intensity with the current of the system, means for mechanically rotating said field structure in synchronism with the electromotive force of the system, means for independently rotating said armature, and means for taking a current from said armtaure and causing it to regulate the action of said battery.

9. The combination of a polyphase alternating circuit, a field structure connected thereto to have a rotary magnetic field, a member having windings and a commutator therefor, brushes thereon, means for maintaining the brushes in a definite position with relation to the position of said field at any given power factor of the circuit, and independent means producing a relative rotation between the brushes and commutator.

10. In an alternating current system of distribution, an alternating current distribution circuit, a regulating dynamo provided with an armature and a field magnet, the strength of the flux of which varies with the intensity of the current of the system, means for mechanically rotating said field magnet in synchronism with the electromotive force of the system, a commutator for said armature, brushes thereon and independent means for rotating said armature with its commutator.

11. In an electrical system of distribution, the combination of an alternating current distribution circuit, a regulating dynamo in operative relation thereto provided with an alternating current rotatable field structure energized by a current which varies with the electrical condition of said circuit, and also provided with an independently rotatable armature, and means for rotating said field structure in synchronism with an electromotive force of the system.

12. In an electrical system of distribution, the combination of a source of polyphase currents, a distribution circuit connected thereto, a regulating dynamo provided with an armature and a polyphase current rotatable field structure having a current varying with the current of the system, and means for rotating the field structure in synchronism with the electromotive force of the system and for independently rotating said armature.

13. In an electrical system of distribution, the combination of an alternating current distribution circuit, a regulating dynamo provided with a rotating alternating current field structure having a current responsive to changes in the electrical condition of the system, and also provided with a rotating armature, and means for driving said field structure synchronously with the electromotive force of the system and independently of the rotation of the armature.

14. In an electrical system of distribution, the combination of an alternating current distribution circuit, a regulating dynamo provided with an alternating current field magnet rotating in synchronism with and having a current varying with the current of the system, and also provided with a rotatable armature and commutator, a synchronous motor for driving said field magnet and independent means for driving said armature.

15. The combination of an alternating current circuit a series transformer therein, a field structure supplied therefrom, a member in inductive relation to said structure having windings and a commutator therefor, brushes thereon, means for producing a relative synchronous rotation between the field structure and the brushes, and independent means producing a relative rotation between the brushes and commutator.

16. The combination of a polyphase alternating current circuit, series transformers therein, a field structure supplied from the secondaries thereof, a member in inductive relation to said structure having windings and a commutator therefor, brushes thereon, means for producing a relative synchronous rotation between the field structure and the brushes, and independent means producing a relative rotation between the brushes and commutator.

17. In an electrical system of distribution, the combination of a dynamo provided with an armature and a rotatable field structure energized by alternating currents, a synchronous motor for rotating said field structure and an independent motor driving said armature.

18. In an electrical system of distribution, the combination of a source of alternating currents, a main distribution circuit connected thereto, and a regulating dynamo provided with a rotatable armature adapted to deliver a direct current and an independently rotatable field structure energized by polyphase currents responsive to variations in the electrical condition of said distribution circuit.

19. In an electrical system of distribution, the combination of a source of alternating currents, a distribution circuit in operative relation thereto, a regulating dynamo provided with an armature and a field energized from the alternating current circuit, means for rotating said field in synchronism with the voltage of said circuit and means for rotating said armature.

20. In an electrical system of distribution, the combination of a main distribution circuit, a storage apparatus in operative relation thereto, and a regulating dynamo provided with a rotatable armature adapted to deliver a direct current and an independently rotatable field structure energized by polyphase currents therein.

21. In an electrical system of distribution, the combination of a main distribution circuit, a storage apparatus in operative relation thereto, and a regulating dynamo having an armature and a field structure independently rotatable, the field structure being provided with distributed windings arranged to produce a rotating field by means of polyphase currents therein, and means for rotating said field structure in the opposite direction to said rotating field and at a speed in synchronism with said polyphase currents.

22. In an electrical system of distribution, the combination of a main distribution circuit, a battery and booster in operative relation thereto, and a regulating dynamo provided with a rotatable armature and an independently rotatable field structure for said armature which is energized by alternating currents therein responsive to changes in the electrical condition of the system.

23. In an electrical system of distribution, the combination of a main alternating current distribution circuit, a battery and booster in operative relation thereto, and a regulating dynamo for the booster provided with an armature and a field structure for said armature which is energized by alternating currents therein responsive to changes in the electrical condition of the system and means for producing relative rotation between said field structure and armature.

24. In an electrical system of distribution, the combination of a main alternating current distribution circuit, a battery and booster in operative relation thereto, a dynamo for regulating the action of said booster responsive to changes in the electrical condition of the system, said dynamo being provided with a rotatable alternating current field structure and a rotatable armature rotated at a speed independent of that of the field structure.

25. In an electrical system of distribution, the combination of a main alternating current distribution circuit, a battery and booster in operative relation thereto, a dynamo for regulating the action of said booster responsive to changes in the electrical condition of the system, said dynamo being provided with an armature and a rotatable field structure energized by polyphase currents therein, means for rotating said field structure in synchronism with the electromotive force of the system and means for independently rotating said armature.

26. In an electrical system of distribution, the combination of a main alternating current distribution circuit, a direct current circuit, a converter between said circuits, a storage apparatus and booster in the direct current circuit, a regulating dynamo provided with a field excited by alternating currents derived from the main alternating current circuit, and with an armature for furnishing a direct current to the booster field the armature and field structure being rotatable relative to one another.

27. In an electrical system of distribution, the combination of a main alternating current distribution circuit, a battery and booster in operative relation thereto, a dynamo for regulating the action of the booster, a transformer in said main circuit and having its secondaries supplying the field of said dynamo with alternating currents, a commutator and brushes for the armature of said dynamo, means for rotating said armature, and independent means for producing relative rotation between the field structure and commutator brushes.

28. In an electrical system of distribution, the combination of a main alternating current distribution circuit, a battery and booster in operative relation thereto, a dynamo for regulating the action of the booster, a transformer in said main circuit having its secondaries connected to the field of said dynamo, condensers in said secondary circuit, a commutator and brushes for the armature of said dynamo, means for rotating said armature, and independent means for producing relative rotation between the field structure and commutator brushes.

29. In an electrical system of distribution, the combination of a main alternating current distribution circuit, a battery and booster in operative relation thereto, a regulating dynamo provided with a field structure energized by alternating currents, a synchronous motor for rotating said field structure, means for rotating the armature of said dynamo and connections between said armature and the booster field.

30. In an electrical system of distribution, the combination of a main alternating current distribution circuit, a battery and booster in operative relation thereto, opposing field coils for said booster, one connected to a substantially constant source of electromotive force and another connected to the armature of a regulating dynamo provided with a rotatable field structure energized by polyphase currents, the value of which varies as the strength of the current in said main circuit and means for independently rotating the armature and field structure of said regulating dynamo.

31. In an electrical system of distribution, the combination of a main polyphase current distribution circuit, a direct current circuit, a battery and booster in the direct current circuit, a converter between said circuits, opposing field coils for said booster, means for keeping the field strength produced by one of said coils practically constant, a dynamo for feeding another and opposing field coil, having a rotatable armature, a transformer in said main circuit, and a rotatable field structure for said dynamo energized by polyphase currents from said transformer, said armature and field structure being arranged to be rotated relative to one another.

32. In an electrical system of distribution, an alternating current distribution circuit, compensatory storage apparatus therefor, a dynamo for regulating the action of said apparatus, said dynamo being provided with a field structure energized by alternating currents responsive to variations in the alternating currents on the distribution circuit and an armature therefor arranged to be rotated with respect to the flux set up by said alternating current field and also arranged to be movable with respect to said field structure.

33. In an electrical system of distribution, an alternating current distribution circuit, a compensatory storage battery and connecting apparatus in operative relation therewith, regulating means therefor, said means including a dynamo provided with a rotatable field structure energized by alternating currents in synchroism with the alternating currents on the distribution circuit, and a rotatable armature arranged to be rotated with respect to the flux set up in said field structure and arranged to be also rotatable with respect to the field structure itself.

In testimony whereof, I have signed my name to this specification, in the presence of two subscribing witnesses.

ALBERT S. HUBBARD.

Witnesses:
EDWIN SEGER,
GORHAM CROSLY.

Copies of this patent may be obtained for five cents each, by addressing the "Commissioner of Patents, Washington, D. C."